G. H. SPENCER.
Improvement in Rotary-Stools.

No. 132,871.  
Patented Nov. 5, 1872.

Witnesses:  
A. W. Almqvist  
C. Sedgwick

Inventor:  
G. H. Spencer  
per Munn & Co.  
Attorneys.

UNITED STATES PATENT OFFICE.

GEORGE H. SPENCER, OF FITCHBURG, MASSACHUSETTS.

IMPROVEMENT IN ROTARY STOOLS.

Specification forming part of Letters Patent No. 132,871, dated November 5, 1872.

*To all whom it may concern:*

Figure 1:
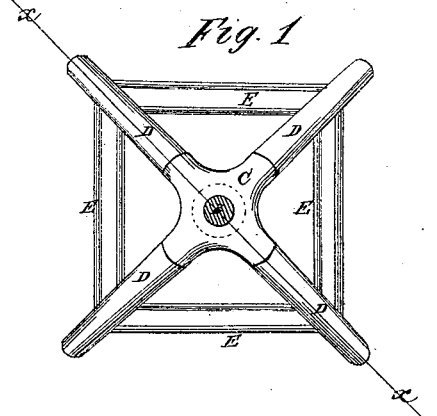
Figure 2:
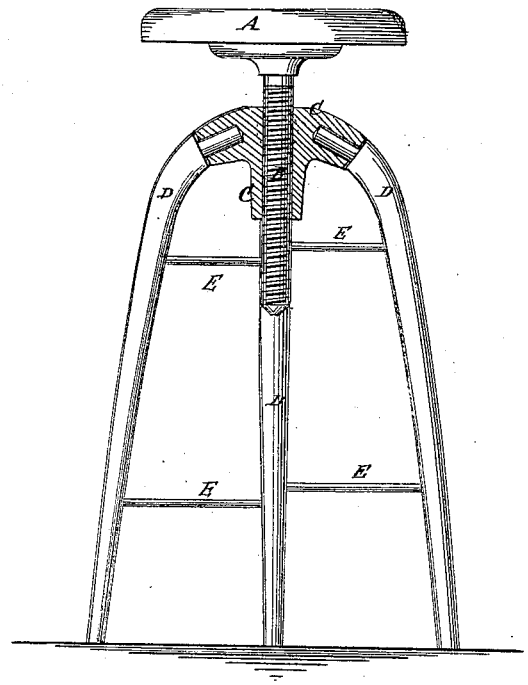

Be it known that I, GEORGE H. SPENCER, of Fitchburg, in the county of Worcester and State of Massachusetts, have invented a new and useful Improvement in Rotary Stools, Chairs, &c., of which the following is a specification:

Figure 1 is a top view of an office-stool, the seat being removed, to which my improvement has been applied. Fig. 2 is a side view of the same, partly in section, through the line $x\ x$, Fig. 1.

Similar letters of reference indicate corresponding parts.

My invention has for its object to improve the construction of rotary office-stools, chairs, &c., so as to make them simpler in construction, stronger and better than the stools and chairs as usually constructed, and at the same time neat and graceful in appearance; and it consists in the cylindrical nut or spider made with radial arms, having longitudinal sockets formed in their outer ends, and in the legs or posts with their upper ends bent inward to enter the longitudinal sockets of the spider, as hereinafter more fully described.

A represents the seat of a rotary office-stool, to which a screw, B, is attached in the ordinary manner. The screw B fits into the thread of the nut C, which is made cylindrical in form to give a long bearing to the screw. Upon the upper part of the nut C are formed four, more or less, radial arms, in the outer ends of which are formed longitudinal sockets to receive the upper ends of the legs or posts D, or tenons formed upon said upper ends. The upper parts of the legs or posts D are bent inward, as shown in Figs. 1 and 2. The arms of the nut or spider C may be curved downward slightly to correspond with the curve of the upper parts of the legs or posts D, to give a neat and graceful appearance to the upper part of the stool. The lower parts of the legs or posts D are connected by rounds or rods E to keep them in their proper relative positions. By attaching a back to the seat A and shortening the legs or posts D the stool becomes a neat rotary chair.

Having thus described my invention, I claim as new and desire to secure by Letters Patent—

As an article of manufacture, an office-stool consisting of the seat A, screw B, nut C, and legs D, constructed and put together substantially as described.

GEORGE H. SPENCER.

Witnesses:
    C. H. POTTER,
    H. E. HUNTLEY.